(12) United States Patent
Van Der Tempel et al.

(10) Patent No.: US 12,445,586 B2
(45) Date of Patent: Oct. 14, 2025

(54) THREE DIMENSIONAL IMAGING SYSTEM

(71) Applicant: VoxelSensors SRL, Brussels (BE)

(72) Inventors: Ward Van Der Tempel, Keerbergen (BE); Johannes Willem Peeters, Antwerp (BE); André Bernard Miodezky, Uccle (BE); Christian Mourad, Genval (BE)

(73) Assignee: VoxelSensors SRL, Brussels (BE)

( * ) Notice: Subject to any disclaimer, the term of this patent is extended or adjusted under 35 U.S.C. 154(b) by 2 days.

(21) Appl. No.: 18/694,914

(22) PCT Filed: Oct. 3, 2022

(86) PCT No.: PCT/EP2022/076182
§ 371 (c)(1),
(2) Date: Mar. 22, 2024

(87) PCT Pub. No.: WO2023/057208
PCT Pub. Date: Apr. 13, 2023

(65) Prior Publication Data
US 2025/0119521 A1    Apr. 10, 2025

(30) Foreign Application Priority Data

Oct. 4, 2021  (EP) ..................................... 21200661

(51) Int. Cl.
*H04N 13/25*        (2018.01)
*H04N 13/296*       (2018.01)

(52) U.S. Cl.
CPC ........... *H04N 13/25* (2018.05); *H04N 13/296* (2018.05)

(58) Field of Classification Search
CPC ........ H04N 13/25; H04N 13/296; G06T 5/70; G06T 2207/20036; G06T 2207/20164; G06T 5/20; G06T 7/521; G01B 11/2518
(Continued)

(56) References Cited

U.S. PATENT DOCUMENTS 6,421,132 B1     7/2002  Brajovic
9,521,399 B1 *  12/2016  Hazeghi ................. G06T 7/521
(Continued)

FOREIGN PATENT DOCUMENTS

| EP | 0294577 A1 | 12/1988 |
|----|------------|---------|
| EP | 3575742 A1 | 12/2019 |
| WO | 0216865 A2 | 2/2002  |

OTHER PUBLICATIONS

International Preliminary Report on Patentability and Written Opinion dated Apr. 9, 2024, for PCT Application No. PCT/EP2022/076182, eleven pages.

*Primary Examiner* — Susan E. Hodges
(74) *Attorney, Agent, or Firm* — Morrison & Foerster LLP

(57) ABSTRACT

Depth imaging system implementing the method of any of the previous claims comprising: a. an imaging device (4) comprising a matrix of pixels (1) each pixel comprising a photodetector (9) capable of detecting single photons impinging thereon and optics able to make an image of the field of view on the matrix of pixel (1), said single photon detector having a binary logic status of true when a photon is detected and a logic status of false when no photon is detected in a timeframe; b. a projector (5) able to project a pattern in a time window of less than 10 μsec, preferably less than 1 μsec; c. a controller synchronising the projector (5) time window and the imaging device timeframe; d. a logic determining, in use, the presence, during the timeframe, of contiguous pixels (11) in the true state, and calculating the depth profile corresponding to said contiguous pixels (11).

15 Claims, 5 Drawing Sheets

(58) Field of Classification Search
USPC .......................................................... 348/46
See application file for complete search history.

(56) References Cited

U.S. PATENT DOCUMENTS

| | | | |
|---|---|---|---|
| 10,652,489 B2* | 5/2020 | Berner | H04N 25/77 |
| 10,948,567 B2* | 3/2021 | Eberspach | G01B 11/026 |
| 2016/0173855 A1* | 6/2016 | Michel | H04N 13/204 |
| | | | 348/46 |
| 2021/0241475 A1* | 8/2021 | Kutulakos | H04N 13/254 |

* cited by examiner

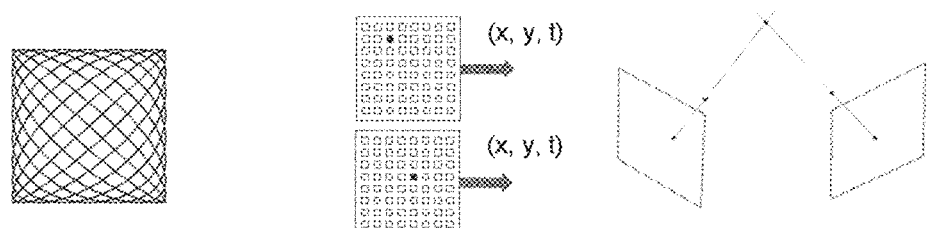
(a)            (b)            (c)
Figure 10
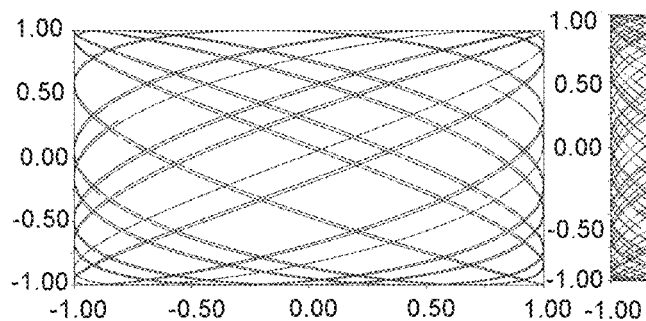 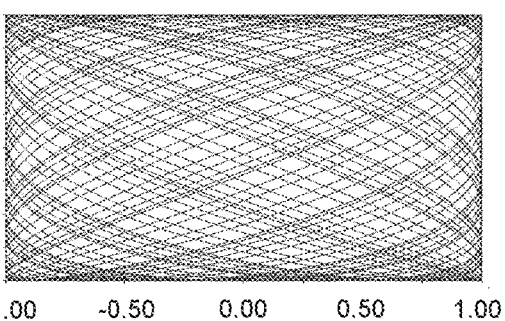
Figure 11            Figure 12
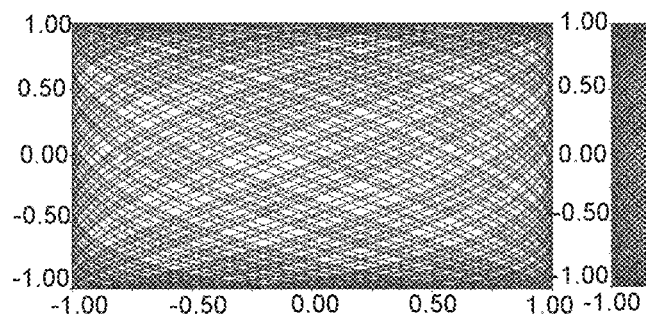 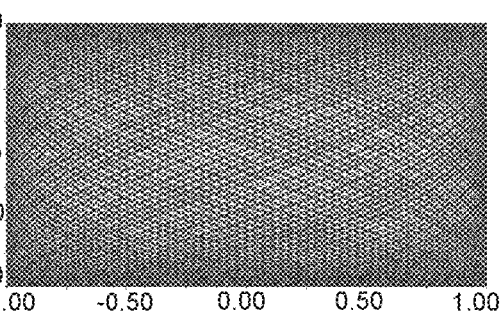
Figure 13            Figure 14
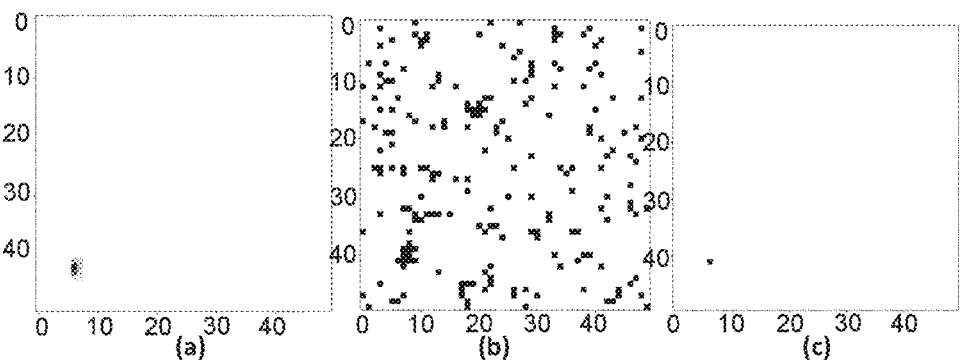
(a)            (b)            (c)
Figure 15

THREE DIMENSIONAL IMAGING SYSTEM

CROSS REFERENCE TO RELATED APPLICATIONS

This application is a U.S. national stage application under 35 U.S.C. § 371 of International Application No. PCT/EP2022/076182, filed internationally on Oct. 3, 2022, which claims benefit of EP Application Serial No. 21200661.3, filed on Oct. 4, 2021, the entire contents of which are incorporated herein by reference.

FIELD OF THE INVENTION

The present invention is related to a three dimensional imaging system.

BACKGROUND

One of the state-of-the-art implementations of depth imaging system is based on structures or lines projected on the scene, which are imaged by an imaging system.

In industrial applications, for example in conveyer-based systems, a fixed line is projected on a conveyor belt and the objects to be scanned are passing through the laser curtain. A high-speed imaging system (order of 1 kps frame rate) is monitoring the distortions of the projected line and deducting the depth profile of the object where the line is projected.

For conveyor systems, the speed of the scan along the object is defined by the speed of the conveyor which is typically slow with respect to the imaging system framerate.

The same type of sensors are not suitable when the laser line is scanning a scene, for example by a 1D MEMS system projecting a moving laser line on the scene. Assuming a refresh rate of 100 Hz, and a lateral resolution of 800 laser lines, the sensor system would need to image each line in 12.5 us, meaning a framerate of 80 kHz. This is above the technical capabilities of typical systems today.

A solution to this was implemented by the first generation RealSense cameras designed by Intel. Instead of imaging each line independently, each imaging frame is looking at a collection of lines projected on the scene. With a MEMS laser scanning device sweeping the scene with a laser line at 10 kHz for example, the line is passing the field of view 100 times each 10 ms. The laser line power is modulated or pulsed in such a way that the illumination device is projecting a set of lines which are imaged together.

A downside is that the sensing speed and delay is no longer defined by the illumination but still by the sensor system which imposes the framerate to the system.

Additionally, sufficient illumination power is needed to operate this system in strong ambient light conditions such as outdoor environments.

This invention formulates an optimized sensor to maximize performance of the laser line scanning system, by being able to image a line using an exposure of only 10's of nanoseconds while minimizing the optical power requirements even in ambient light conditions.

SUMMARY OF THE INVENTION

A first aspect of the present invention is related to a method for determining the depth profile of a field of view comprising the steps of:
  projecting by means of a projector (5) at least one light pattern onto the field of view, the projection occurring in a time window of less than 10 µsec, preferably less than 1 µsec;
  imaging the projected pattern by means of a camera sensor (4) and optics, synchronised with the projection of the pattern during at least one observation window within said time window, said camera sensor comprising a matrix of pixels (1), each comprising a photodetector, said pixels (9) being in a false status when no light is detected by the corresponding photodetector, and in a true status when light is detected by the corresponding photodetector thereby obtaining a first binary matrix of pixels representing the field of view;
  separating the projected pattern from an ambient light noise (10) on the binary matrix of pixels by considering only pixels in the true status having at least one neighbour pixel also in the true status on the matrix of pixel (1) obtained in one observation or a combination of the at least two observations within said time window thereby obtaining a second binary matrix of pixels representing the projected pattern;
  based on triangulation between the projector (5) position, the camera (4) position and the second binary matrix of pixel calculate the depth profile corresponding to the projected pattern;
  scan the projected pattern by repeating steps a to d on the entire field of view for determining the depth profile on the entire field of view; wherein each isolated elements of the pattern is extending in the binary representation on at least two contiguous pixels.

Preferred embodiments of the method of the invention comprise one or a suitable combination of more than one of the following features:
  the projected pattern comprises at least one continuous line, the step of separating the projected pattern from the ambient noise by only considering true pixels forming at least one continuous line;
  more than one continuous lines are projected simultaneously;
  the projected continuous line is a straight line, sequentially scanned on the entire field of view or on a partial part of it forming a region of interest;
  the straight line is oriented in a predetermined direction, the step of separating line from the ambient noise using the predetermined direction for analysing a probability of a neighbour pixel being part of the projected straight line;
  the probability of a pixel being part of the projected pattern is determined by a trained neural network;
  the displacement of the projected pattern between two successive projections is corresponding to less than one pixel width, the depth resolution being improved by interpolation of the determined depth between successive line scans.
  the projected line is produced by moving at least one laser beam on the field of view;
  each photodetector comprises a single photon detector.

A second aspect of the invention is related to a depth imaging system implementing the method of the invention:
  an imaging device comprising a matrix of pixels each pixel comprising a photodetector able to detect single photons impinging thereon and optics able to make an image of the field of view on the matrix of pixel, said single photon detector having a binary logic status of true when a photon is detected and a logic status of false when no photon is detected in a timeframe;
  a projector able to project a pattern in a time window of less than 10 µsec, preferably less than 1 µsec;
  a controller synchronising the projector time window and the imaging device timeframe;

a logic determining, in use, the presence, during the timeframe, of contiguous pixels in the true state, and calculating the depth profile corresponding to said contiguous pixels.

Preferably, the projector is arranged to project the lines in a predetermined direction for improving line detection by the logic.

Advantageously, the matrix of pixel comprises a first layer comprising the single photon detector and a second layer comprising a neighbourhood testing circuit, the neighbourhood testing circuit being arranged so that the output of the second layer circuit being true only if the corresponding single photon detector and at least one adjacent single photon detector are simultaneously in true status, thereby determining which pixels have at least one contiguous pixel in the true logic status.

BRIEF DESCRIPTION OF THE FIGURES

FIG. 10 illustrates a laser-based illumination and triangulation algorithm, according to embodiments of the invention.

FIGS. 11-14 show aggregated scan lines that result from applying 2 millisecond, 5 millisecond, 10 millisecond, and 20 millisecond aggregation windows, according to embodiments of the invention.

FIG. 15 displays a comparison between (a) the ground truth, (b) raw detections, and (c) filtered detections, according to embodiments of the invention.

FIGURE KEYS

Figure 1:
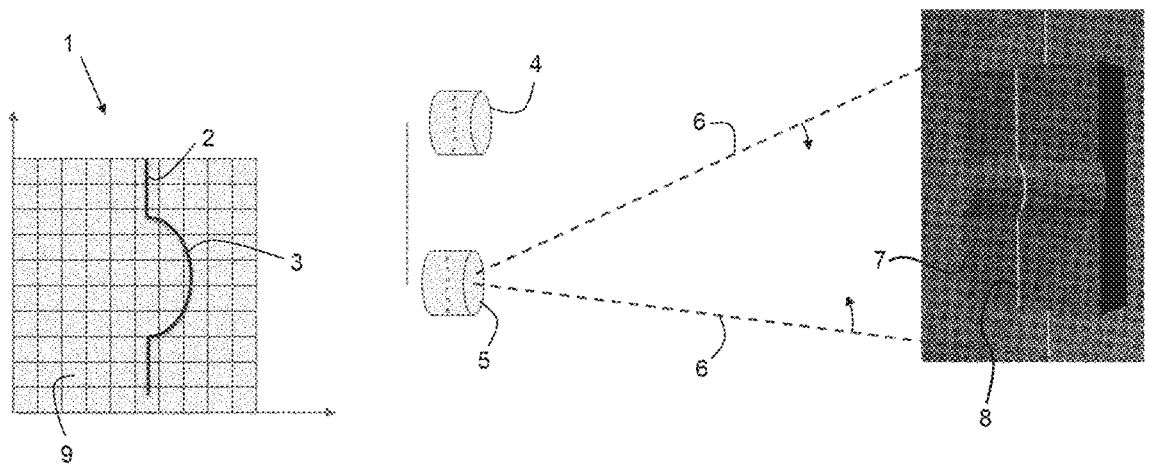
FIG. 1 represents an ultra-fast line scanner according to the invention.

1. Image sensor (pixel matrix)
2. Laser line
3. Deformed laser line
4. Camera (including sensor and optics)
5. Laser projector
6. Laser beam (limits of the linsescan)
7. Object to be scanned
8. Projected line
9. Individual pixel
10. Pixel detecting noise from ambient light
300. Time window for spatial dithering
301. X direction spatial range of dithering (projector)
303. X direction pixelization
312. Real line position
314. hit distribution (sum of instantaneous measured positions over time scan)
315. average position of the measured position
322. Spatial distribution of moving dot
324. hit distribution
325. average position of the measured position
400. Field of view
401. Dot pattern
402. Dot pattern
403. Cross pattern
404. Circle pattern
411. pattern projector
412. Light source
413. imaging plane such as a diffraction grating
414. mirror FIG. 10 illustrates a laser-based illumination and triangulation algorithm, according to embodiments of the invention.

FIGS. 11-14 show aggregated scan lines that result from applying 2 millisecond, 5 millisecond, 10 millisecond, and 20 millisecond aggregation windows, according to embodiments of the invention.

FIG. 15 displays a comparison between (a) the ground truth, (b) raw detections, and (c) filtered detections, according to embodiments of the invention.

Figure 16:
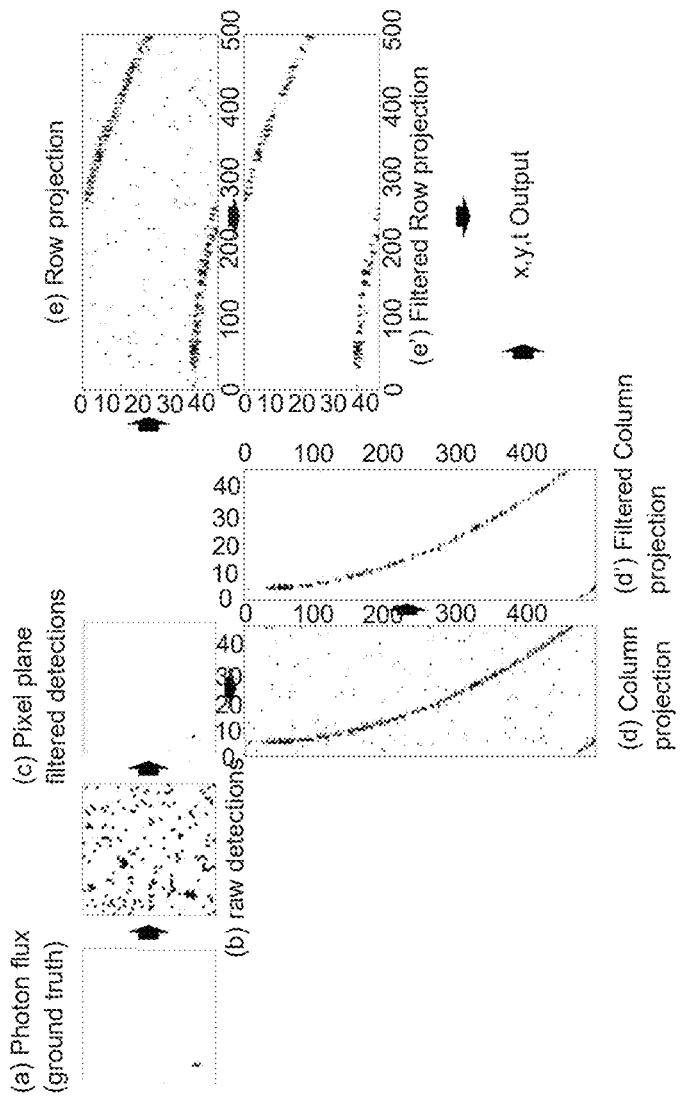
FIG. 16 demonstrates how plotting projection vectors over time forms a new image showing the trajectory of the projected dot or structure, according to embodiments of the invention.

FIG. 16 demonstrates how plotting projection vectors over time forms a new image showing the trajectory of the projected dot or structure, according to embodiments of the invention.

DETAILED DESCRIPTION

The invention described below proposes a system that is able to image a 3 dimensional scene at high speeds. To that aim, the system projects a light pattern such as a line on the scene at high frequency, the pattern being displaced between each shot to be able to reconstruct the entire scene.

As an example, let's assume a 1-axis oscillating MEMS projecting a laser line, sweeping this laser line across the field of view (FoV) at 1 kHz to 10 kHz, meaning that in a period of 100 us to 1 ms the complete scene or FoV is sensed.

With as an example 1000 line pulses per oscillation period, each line needs to be imaged with the imaging system each meaning 100 ns to 1 us per line (Tline)

To achieve a sensor or imaging system that is capable of imaging a line in the scene each Tline in the presence of ambient light, a sensor system was used.

The invention is related to depth imaging system comprising a sensor, said sensor comprising an array of pixels, each pixel being capable of detecting single photons, for example by means of single-photon avalanche diode (SPAD).

The sensor is preferably synchronised with a pulsing laser line (or pattern), so that the sensor knows when to expect photons from each projected laser line. The pixels are activated during a short observation window, preferably ranging from one nanosecond to 100 s of nanoseconds. During this observation window, the single photon detector pixels trigger or change state when a photon is detected. Photons detected will not only originate from the laser line energy, but also from ambient light present in the scene.

To identify the location of the laser line, a coincidence imaging method is proposed, which only considers the triggering of a pixel a valid trigger, when neighboring pixel or pixels have also triggered during the observation window. Because ambient light will trigger all the pixels in a statistical manner, the chance of neighbouring pixels firing during the short observation window due to ambient light can be minimized, while the pulsed optical energy of each laser line can be designed in such a way that neighbouring pixels, connected along the line, have a high probability of firing together. In such a way the laser line can be easily isolated in the noisy binary image.

Figure 2:
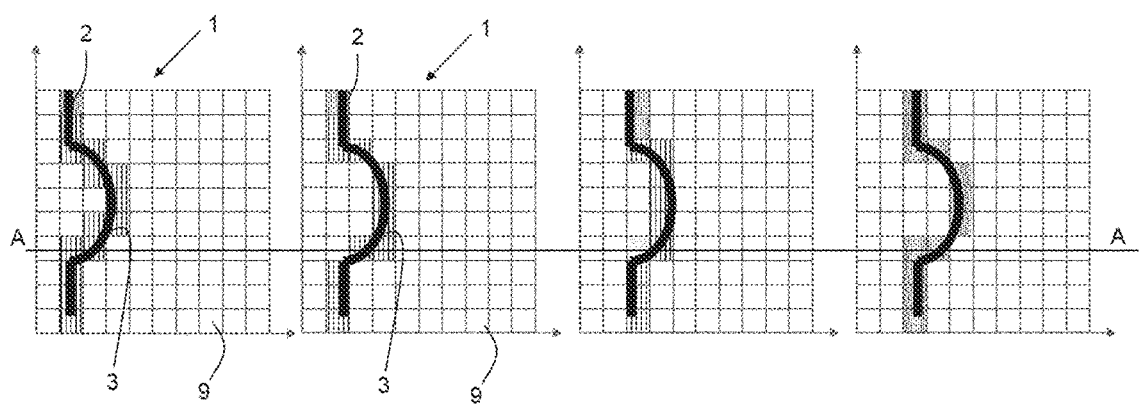
FIG. 2 a to d represents lines can pixelisation in line scan spatial dithering conditions.
Figure 3:
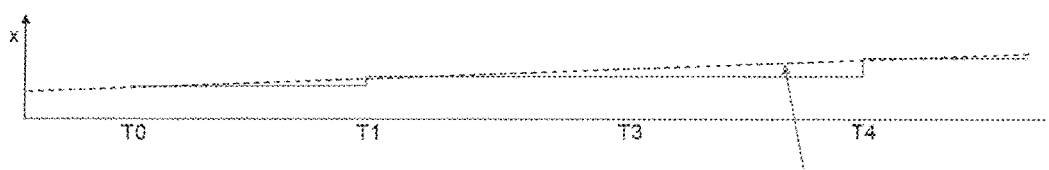
FIG. 3 represents the results of interpolation of the position of the line scan of FIG. 2 along the line A-A.

In a first embodiment, shown in FIG. 2 the region of interest (ROI) is read out column by column or row by row, and the pixel map is built to identify the location and shape of the line. Since we know the line is continuous and piece-wise continuous, this can be used as a constraint to identify which pixels are part of the line. For example, an isolated pixel event is likely not part of a piece-wise continuous structure. Additionally, another constraint can be that when considering a vertical line as projected structure, in the detected ROI map, 2 separate events in the same row, must be either adjacent—in which case the line is detected on the boundary of or partially covering the adjacent pixels, in which case we can apply some super-resolution—or in the case the detected events are not adjacent, only 1 of the pixels will have a line-connected event and the other pixel will have a random event. By looking at the events in the next or previous row, 1 can get additional information as to which event was the true event, since we expect true events to be connected in piece-wise linear fashion in the vertical dimension—since we are projecting a vertical line.

A similar description can be built in the other dimension where we are projecting a horizontal line.

By constraining the projected line to a vertical or horizontal shape, it becomes easier to define an expected region of interest to be read out, reducing the number of pixels to be read and analysed each line-shot. The ROI is then defined by the maximum disparity one wants to allow in the system.

Of course, any orientation of the line could be applied if one does not have this limitation, for example this is applicable in massively parallel connected processing in the case of stacked systems, where the pixel plane is connected in a parallel fashion to the processing layer, rather than by busses such as typically is the case in image sensors.

A second aspect of the invention is related to a stack devices, whereby a first layer includes the photon detectors such as the SPAD array as well as some optional electronics to control the SPAD array and pixels, possibly quenching resistors or circuits, and whereby a second layer, parallelly connected to the first layer by means of 1 or more electrical connections per detector or detector group. The second layer processes the information coming the first layer. In a first variation, the coincidence imaging as well as the line detection is performed by logic in the second layer.

In another variation, a massive parallel connection connects the SPAD array with a neural network which computes the location of the line segments in the raw data image, whereby the neural network is trained to distinguish between noise and line information.

Figure shows a sequence of lines in the case of horizontal resolution of 10 lines each oscillation period of the line scanner. At T0 to T4 the laser line is moving from left to right, which we can call the sweep-right lines, while from T5 to T9 the laser line is moving from right to left, the sweep-left lines, in this figure in an interleaved fashion, creating a resolution of 10 in the horizontal direction each period of the line scanner.

Other embodiments can be created where the positions of the lines of the sweep-left and sweep-right coincide, reducing the horizontal resolution of the depth image but increasing the temporal resolution on those line samples.

In case of 500 sweep-right lines and 500 interleaved sweep-left lines, or vice-versa, the full line resolution per period becomes 1000.

This means that each 100 us, 1000 lines need to be constructed, and thus approximately every 100 nanoseconds the ROI needs to be read. When combined with a SPAD pixel array or a quanta image sensor with limited bit depth, this requirement is feasible.

Alternatively, the pixel array in its entirety or a region of interest of the array, is connected in parallel to a process plane. For example in stacked sensor devices, the pixel array or sensor array which is sensitive to the optical input can be positioned on a first plane, with each pixel connected by means of an interconnect method to the processing layer physically located on a second plane of the sensor.

In this case, we can describe a processing element or neural network that is connected to the active ROI or complete pixel array and is capable of finding the line or piece-wise lines in a noisy image with random events or pixels data and events or pixel data connected to the line of interest.

Coincidence can be applied on the ROI after reading out each individual pixel, or in the pixel area itself.

The line will be moving each timestep at subpixel resolution as shown in drawing 2. By analyzing the triggered pixel positions of the previous detected lines, a better estimate can be obtained at given timestamps by subresolution. This impose of course constraints on the spatial frequency of the object we are detecting.

It however creates a method for superresolution by considering the temporal behaviour of the line movement.

Super Resolution by Special (Structural) Dithering, to Increase Depth Accuracy

In traditional dot-pattern active stereovision systems, the dots are static in space. If the scene is not moving the dots have a fixed position on the scene and thus in the image. The spatial quantization by sampling the scene with an imager with certain spatial resolution, imposes limitations on the depth estimation. In the article "Noise in Structured-Light Stereo Depth Cameras: Modeling and its Applications" by A. Chatterjee et Al. (https://arxiv.org/pdf/1505.01936.pdf) the noise of a stereo system is described $$\frac{\partial D}{\partial Z} = -\frac{fB}{Z^2} \Rightarrow \frac{\partial Z}{\partial D} = -\frac{Z^2}{fB}$$

The delta depth is linear with the delta disparity. This means that the quantization of the disparity limits the accuracy of the depth estimation.

In this invention, the limitation of the disparity quantization because of pixel pitch is mitigated, by means of a spatial dithering. By constructing the depth estimation from a collection of neighboring, related measurements at slightly different locations in the scene, the depth estimation can be improved. This idea is similar to the idea of quantization with a 1-bit AD convertor and dithering. If the dithering noise is white and surpass the quantization, by means of averaging of the end results, a better estimate can be created. The same applies to this spatial dithering concept, whereby the pixel is quantizor and the moving dot is the spatial dither. If the spatial dither surpass the pixel quantization in terms of amplitude, and the distribution of the dither is known (it is, because the system controls the light) a more accurate subresolution measurement can be obtained.

The invention builds further on the possibility of extremely fast sensing—almost continuous—, whether it is a line, a dot or a dot pattern.

The idea is to impose on the illumination a known spatial probability.

In the case of a single point or dot, or dot pattern—multiple points projected in parallel. For the sake of clarity I will focus on a single point, but this method extends to any projected structure:

If we are able to track the position of the dot (or structure) with very high speed, we can built super-resolution by spatial dithering.

We impose a known spatial probability distribution on the location of the dot in for example the horizontal direction. This can be a uniform probability distribution, or gaussian, or any other function, but preferably a smooth distribution.

Figure 4:
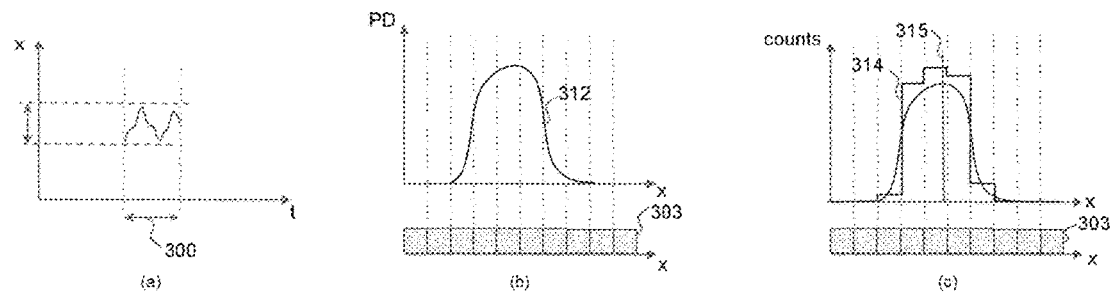
FIG. 4 represents results of random spatial dithering to estimate subpixel resolution.

FIG. 4 shows a location dithering method.

In FIG. 4(a) the dot position is changed—dithered—across a certain location range 301 during a time window 300. Accumulating the probability distribution of the location x of the dot during this time window 300, a probability density function 312 can be found.

The pixel array will sample this function on discrete moments in time using pixels 303 with finite size creating a quantization. This quantization creates a histogram 314. By monitoring the dithered x location during a period of time 300, an average location 315 can be computed from the histogram 314, which is more accurate than if the dot with a static location would be observed by the quantizing pixels. In such a way, the accuracy of the average dot location can be obtained with greater resolution.

Figure 5:
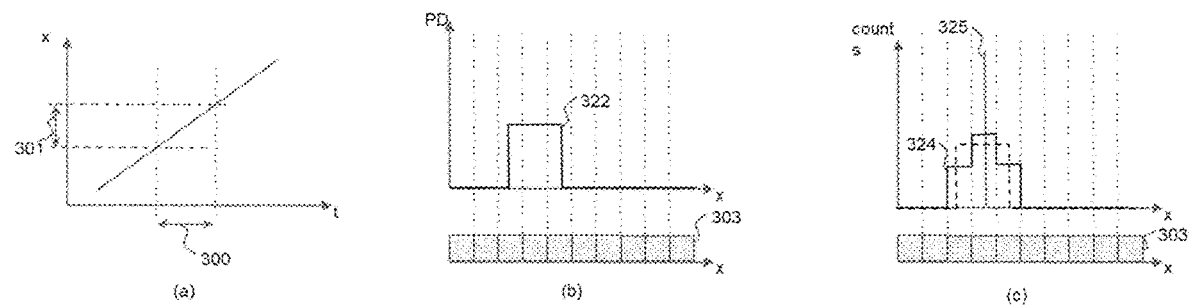
FIG. 5 represents results of estimate subpixel resolution by known dot movement.
Figure 6:
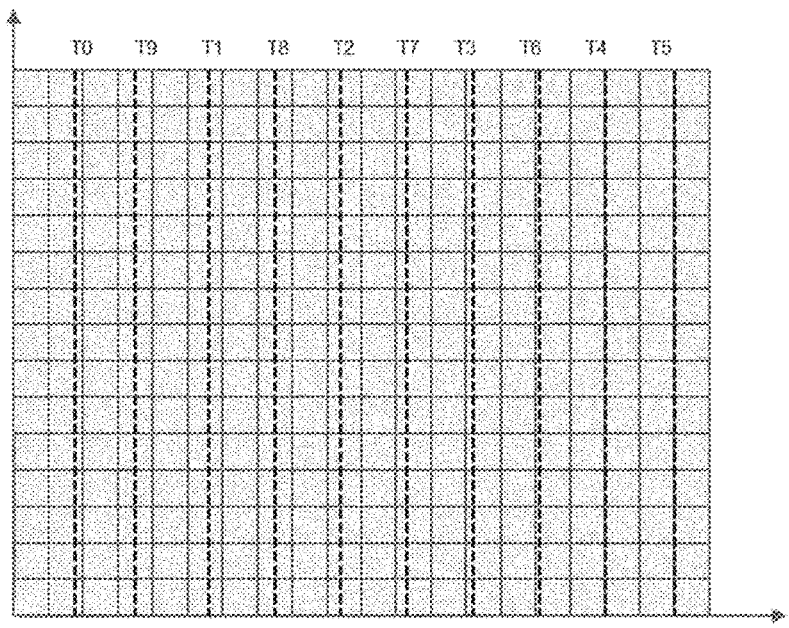
FIG. 6 represents line scan interleaved motion.
Figure 7:
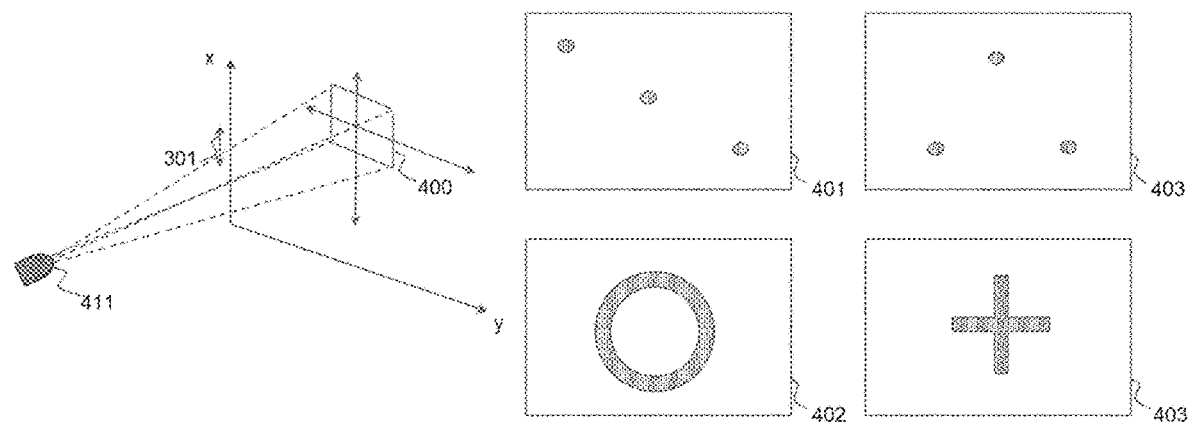
FIGS. 7 and 8 represents projections of different patterns instead of a simple line.
Figure 8:
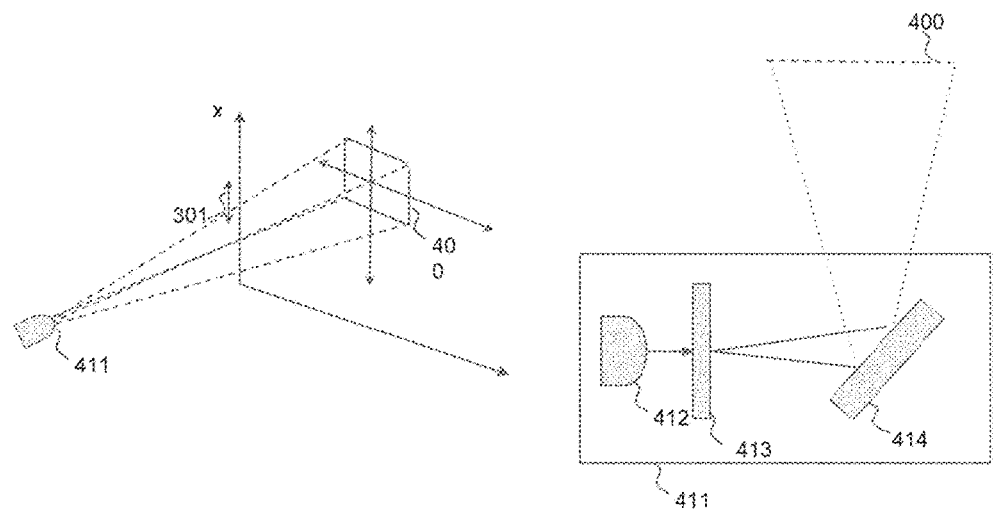
Figure 9:
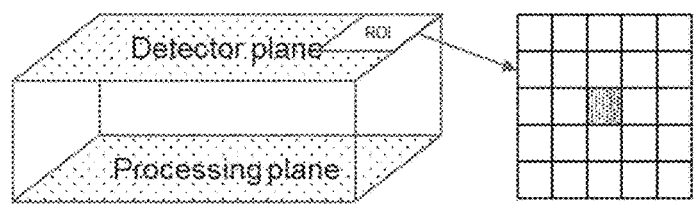
FIG. 9 represents a two layer imaging sensor.

The principle can be extended to for example quite simple spatial dithering or distributions such as in FIG. 5

A third aspect of the invention is related to a method for determining the depth profile of a field of view, similar to the method according to the first aspect. However, step c (separating) is optional, since the method of determining the depth profile may also be performed with other filtering steps as understood by the skilled person. A fourth aspect of the invention is related to a method for determining the depth profile of a field of view, similar to the method according to the first aspect. However, step b comprises imaging by means of two cameras, each having a matrix of pixels, and step d comprises triangulation based on the positions of the two cameras and the two matrices of pixels. The skilled person appreciates that triangulating data of two cameras or of one camera and one light source is conceptually similar. A fifth aspect of the invention is related to a depth imaging system, preferably implementing the method of the third and fourth aspects.

Preferably, the projector projects a simple structure such as an ellipsoid or circular dot onto the scene and scans the scene in a raster, Lissajous or another pattern.

Preferably, each camera is adapted to track the position of the dot in each of the image planes and output a stream of (x, y, t) data where x, y are coordinates in the image plane (pixel dimension) and t is the timestamp of the detection. This is advantageous in allowing to output such streams with a temporal resolution up to 10 nanoseconds. For example, FIG. 10 shows the laser-based illumination continuously sweeps the world in fast strokes. A Lissajous pattern is generated based on a fast 2D MEMS mirror. Two or more sensors snapshot the position of the laser dot at a very fast rate (up to 100 MHz). Each sensor sends out the laser dot position, after which a simple triangulation algorithm allows to compute precise 3D shape, position, contour, and motion at said very fast rate.

The methods and systems of this invention are advantageous for a few reasons as summarized below. The first advantage is related to power. Here, a single dot (or a set of dots) is projected at a time, bundling all the energy to sample a certain location in the scene in the shortest time possible, obtaining the best immunity to ambient light for the lowest photon budget. The required photon budget to be able to sense the dot however depends on the sensing technology used. For example, it is possible to detect a dot with just 12 photons, distributed on 2 pixels (6 photons/pixel). Furthermore, the shorter the time needed to produce a return of 6 photons per pixel, the better the immunity to ambient light. Therefore, this system preferably uses short high power pulses.

Additionally, because power can be varied rapidly while scanning, it is possible to create a frame where the laser power is dynamically allocated. For example, distant or dark objects can be illuminated with greater laser intensity, while objects close at hand can be illuminated with lower laser power. This can be modulated within a scan and can be optimized to maintain class-1 eye safe limits while optimizing system range, power consumption, and scan density.

In another example, in nearfield regions, the system can increase pulse density and reduce pulse intensity to achieve a more precise mesh. In more distant regions, the system can reduce pulse density and increase pulse intensity to achieve a useable signal. The product of pulse density and intensity can be maintained under class-1 eye safe constraints if desired, or could be further reduced at times when power consumption concerns outweigh scan density needs. The scan pattern does not need to be altered to produce these varying-density scans.

A second advantage of this invention is related to bandwidth. Scanning depth sensing systems offer a unique advantage in the way the depth data is represented and transmitted. The depth data can be represented as a series of x, y, z points, as expected from any point cloud representation. However, chronologically, the points in the point cloud are created along a defined laser beam trajectory. As such, the points along the trajectory are typically 'connected' in a certain way, influenced by the scene itself. The fact that the points or samples are connected along a trajectory can be leveraged in the data representation. Instead of outputting each sample individually, the trajectory can be described with a limited set of coefficients and 2 points describing the start and stop of the polynomial descriptor. This enables 'live' compression, greatly reducing the bandwidth requirements from sensor to system as well as memory and compute requirements for further processing.

A third advantage of this invention is related to immunity. Laser beam scanning based systems using the sensors of this invention offer best-in-class immunity to concurrent active systems. Using a laser beam scanning approach, the depth information is obtained by triangulating single point pairs in the respective image spaces tracking the dot. As such, the introduction of additional systems in the environment will create additional dots scanning the scene. When the sensors used to track the dot are capable of tracking multiple dots, the additional optical information created by the additional scanning dot, will just contribute to the depth data being obtained as another point pair that can be triangulated.

Laser beam scanning systems have also immunity to flood systems (active stereo, mono NIR with flood, iToF). The system is capable of suppressing the influence from ambient light by imposing requirements on the photon statistics and behaviour of the projected dot. Flood illumination resembles in terms of statistics and behaviour to ambient light: it does create high peak flux (energy/pixel/time) and requires typically several hundreds of microseconds to milliseconds to get some integrated signal in the pixels, while not having any spatio-temporal structure. For example, the system uses a combination of photon statistics, beam shape, and beam spatio-temporal movement to distinguish signal from ambient/flood sources and optical signal origination from the laser beam scanning system itself.

Laser beam scanning systems have also immunity to dot pattern projectors. Two elements distinguish a Structured Light system using dot patterns from dynamic Laser beam scanning structured light. Firstly, the dot pattern is static and will not have any moving behaviour or trajectories. Secondly, the available optical power is spread between 10 k or so dot in parallel, meaning that the allocated peak power per dot is significantly less than the allocated peak power in the Laser beam scanning system. Thirdly, the structured light projectors are designed to work together with global shutter imagers, which have typical exposure times in the order of 100 s of microseconds. The energy required to see the dots is thus spread in the exposure window.

A fourth advantage of this invention is related to latency. The system uses a fully serialized sensing method, where the data is produced serially as the beam scans the field of view. The time needed between the optical sampling of the scene (projection of a dot on a certain surface) and the production of the depth data corresponding to that sample is very short, since the method relies purely on the following. First, the sensing of the dot location in the different image spaces: using this system of this invention can be in the order of 10 nanoseconds. Second, the transfer of the coordinates to the sensing host: N clock-cycles, typically 100's of nanoseconds. Third, filtering method using historical data and triangulation of the point in space, which can be pipelined math operations in 100's of nanoseconds.

The resulting latency from optical sample to depth measurement is thus extremely short. Of course, to obtain a sample of the complete scene, the laser beam still needs to scan the desired field of view with a desired density. Depending on the scan speeds of the Laser beam scanning and the desired density for the application, a certain data aggregation window can be considered. In contrast to frame-based sensors, there are no frame buffers to consider which add to the overall sensing latency.

An interesting feature of laser beam scanning sensing technology is that an application-customized trade-off can be selected with optimal density versus refresh rate. This is entirely due to the sequential nature of the system, as sensing data is produced sequentially. Depending on the data aggregation window applied on the data stream, the scanning dot will have created a sparse or dense pattern of scan lines during the window.

Algorithms requiring fast update rates (500 Hz) using sparse data can run in parallel from algorithms requiring normal update rates (50 Hz) using dense data, utilizing the same data stream as input. FIGS. 11-14 show the aggregated scan lines using 2 millisecond, 5 millisecond, 10 millisecond, 20 millisecond aggregation windows applied to the same data stream. The LBS frequency pair for the 2D oscillating MEMS structure used to obtain the simulated scan lines are (8174 Hz, 5695 Hz).

Using SPADs in the pixels is advantageous because it is sensitive to a single photon, which means that the active projected structure will need a minimum amount of energy since the detector is single photon sensitive. Another advantage is sub-ns response time, meaning the photon is detected and encoded into a digital signal in nanoseconds.

The system is able to filter out the false positives created by thermal noise and ambient light impinging on the sensor area. FIG. 15 shows (a) the ground truth, (b) raw detections, and (c) filtered detections. A first filtering step is happening inside the pixel plane, meaning this filter operates in parallel on each of the pixels. Typically this filter exhibits either a spatial filtering method, a temporal filtering method, or a combination thereof. These filters can be implemented using transistor level, RTL, more complex compute architectures, neural networks or other.

The system relies on two basic principles for filtering in the pixel plane. The first principle is spatial. By imposing a certain shape on the projected dot we can constrain the pixel to only flag a valid detection when the impose kernel was detected within a specified time. For example, a 2×1 kernel can be imposed, meaning that the projected dot must span at least 2×1 pixels. When shooting optical pulses of length tp, the constraint imposed on the pixels will be that a cluster of 2×1 pixels must fire within tp in order to consider the detected photons to come from the active projection. This principle is referred to as coincidence.

A second principle is spatio-temporal. We can impose that the trajectory of the dot is continuous, provided the pulse repetition frequency is higher than the dot displacement velocity. For example, in case of 1 ns pulses repeated every 40 ns, a temporal window of 41 ns will be able to catch 2 pulses. By imposing that the pixel (or pixel cluster) must see at least 2 pulses in the 41 ns window we can filter out a significant portion of the detected ambient photons, since the ambient light photon statistics have a low chance to generate 2 consecutive detections in s 42 ns window. This principle is referred to as persistence. By applying a combination of both coincidence and persistence, a powerful filtering strategy is created which is quite efficient in terms of hardware implementation.

After the in-pixel-plan filtering, the fastest way to output the array data is to compress it, for example by means of projection onto the axis of the imager. In order to support multi-dot scanning and to reduce the aliasing after projection, the imager is first divided, for example, into 16×16 tiles of 64×64 pixels whereby each of the tiles can output its projections to the digital logic typically on the periphery of the device. The projection operation creates 2 vectors (times N×N tiles), 1 vector each for the row and the column projections.

It is to be noted that the creation of the vectors based on the projection data is the step which takes the data from the asynchronous domain inside the pixel array to the synchronous domain at the periphery. While the inpixel filtering can be implemented synchronously, it is not required. As such, the vectorization of the projections is discretizing the data in time, for instance every 10 ns a new vector is created based on the projection events coming in during those 10 ns.

As shown in FIG. 16, when plotting these vectors over time, a new image is formed, which starts showing the trajectory of the projected dot or structure (d, e). This 'image' can again be processed and filtered to create a filtered projection-time dataset (d', e') for each of the projections. These directly yield then x, y data for each timestep (x, y, t).

Further embodiments and relevant disclosure can be found in patent applications nr. PCT IB2021 054688 "Pixel sensor system", #PCT EP2021 087594 "Neighborhood-gated switching pixel sensor", PCT/IB2022/000323 "Pixel array with dynamic lateral and temporal resolution", and PCT/1IB2022/058609 "Persistence filtering in SPD arrays", the disclosures of which are incorporated by reference.

As discussed above, the displacement of the projected pattern between two successive projections is corresponding to less than one pixel width, the depth resolution being improved by interpolation of the determined depth between successive line scans. However, this is not to be understood as limited to line scans, as said interpolation can work equally well when using dot scans.

The invention claimed is:

1. A method for determining a depth profile of a field of view, the method comprising:
   projecting, by a projector, at least one light pattern onto the field of view, the projection occurring in a time window of less than 10 µsec;
   imaging the projected pattern, by a camera sensor and optics, synchronized with the projection of the pattern during at least one observation window within the time window,
      wherein the camera sensor comprises a matrix of pixels, each pixel comprising a photodetector,
      wherein the pixels are in a false status when no light is detected by the corresponding photodetector, and in a true status when light is detected by the corresponding photodetector thereby obtaining a first binary matrix of pixels representing the field of view;
   separating the projected pattern from an ambient light noise on the first binary matrix of pixels by considering only pixels in the true status having at least one neighbor pixel also in the true status on the matrix of pixel obtained in at least one observation within the time window thereby obtaining a second binary matrix of pixels representing the projected pattern;
   calculating the depth profile corresponding to the projected pattern, based on triangulation between the projector position, the camera position, and the second binary matrix of pixel; and
   scanning the projected pattern by repeating the projecting, imaging, separating, and calculating on the entire field of view for determining the depth profile on the entire field of view;
   wherein each isolated element of the pattern is extending in the binary representation on at least two contiguous pixels.

2. The method of claim 1, wherein the projected pattern comprises at least one continuous line, wherein separating the projected pattern from the ambient noise comprises separating the projected pattern from the ambient noise by only considering true pixels forming at least one continuous line.

3. The method of claim 2, wherein a plurality of continuous lines are projected simultaneously.

4. The method of claim 2, wherein the projected continuous line is a straight line, sequentially scanned on the entire field of view or on a partial part of it forming a region of interest.

5. The method of claim 4, wherein the straight line is oriented in a predetermined direction, wherein separating the projected pattern from an ambient light noise comprises separating the straight line from the ambient noise using the predetermined direction for analyzing a probability of a neighbor pixel being part of the projected straight line.

6. The method of claim 1, wherein a probability of a pixel being part of the projected pattern is determined by a trained neural network.

7. The method of claim 1, wherein a displacement of the projected pattern between two successive projections corresponds to less than one pixel width, the depth resolution being improved by interpolation of the determined depth between successive line scans.

8. The method of claim 2, wherein a projected line is produced by moving at least one laser beam on the field of view.

9. The method of claim 1, wherein each photodetector comprises a single photon detector.

10. A depth imaging system comprising:
    an imaging device comprising a matrix of pixels,
    each pixel comprising a photodetector capable of detecting single photons impinging thereon and optics able to make an image of the field of view on the matrix of pixels,
    the photodetector comprising a single photon detector having a binary logic status of true when a photon is detected and a logic status of false when no photon is detected in a timeframe;
    a projector able to project a pattern in a time window of less than 10 µsec;
    a controller synchronizing the projector time window and the imaging device timeframe; and
    a logic determining, in use, the presence, during the timeframe, of contiguous pixels in the true state, and calculating a depth profile corresponding to the contiguous pixels.

11. The depth imaging system of claim 10, wherein the projector is arranged to project the lines in a predetermined direction for improving line detection by the logic.

12. The depth imaging system of claim 10, wherein the matrix of pixels comprises a first layer comprising the single photon detector and a second layer comprising a neighborhood testing circuit, the neighborhood testing circuit being arranged so that the output of the second layer circuit being true only if the corresponding single photon detector and at least one adjacent single photon detector are simultaneously in true status, thereby determining which pixels have at least one contiguous pixel in the true logic status.

13. The depth imaging system of claim 10, wherein the depth imaging system implements the method of claim 1.

14. The method of claim 1, wherein the time window is less than 1 µsec.

15. The depth imaging system of claim 10, wherein the time window is less than 1 µsec.

* * * * *